Patented Mar. 1, 1932

1,847,101

UNITED STATES PATENT OFFICE

EUGEN RYSCHKEWITSCH, OF FRANKFORT-ON-THE-MAIN, GERMANY, ASSIGNOR, BY MESNE ASSIGNMENTS, TO THE ROESSLER & HASSLACHER CHEMICAL COMPANY, OF NEW YORK, N. Y., A CORPORATION OF DELAWARE

PROCESS FOR THE MANUFACTURE OF ARTICLES OF ZIRCONIUM OXIDE

No Drawing. Application filed June 18, 1928, Serial No. 286,493, and in Germany June 29, 1927.

This application is a continuation in part of my co-pending application S. N. 242,521—filed Dec. 24, 1927—process for the manufacture of zirconium oxide articles, which describes a method of preparation of articles from zirconium oxide by mixing zirconium oxide with a hydrolyzable metal chloride and water to produce a plastic mass capable of being formed or molded into various shapes and which produces upon burning, articles which are resistant to high temperatures and chemical action.

I have now found that non-metallic halogen compounds which can be volatilized when heated may be mixed with zirconium oxide to produce plastic masses which may be moulded readily and which upon burning produce coherent materials extremely resistant to heat, chemicals, and mechanical forces. By non-metallic halogen compounds which can be volatilized, I mean those which are volatile, or which give volatile products when heated, as well as those which react with a volatile liquid such as water, which I add in comparatively small amounts to the mixture of zirconium oxide and non-metallic halogen compound as an improvement in my invention.

As examples of materials which may be used with zirconium oxide in accordance with the present invention, may be mentioned hydrogen halides and compounds such as sulphuryl chloride, ammonium fluoride, acetyl chloride, benzoyl chloride, acetyl bromide and the like. I have also found that halogen acid salts of organic bases such as aniline hydrochloride may be used for the same purpose. One of the classes of materials which come within the definition of my invention is that class which is hydrolyzed by water to a hydrogen halide and a volatile reaction residue, such as acyl halides, sulfuryl chloride, and the like.

In carrying out my invention I mix the halogen compound with zirconium oxide containing very little or substantially no water, or with zirconium oxide which has been carefully dried. The mixture may preferably be produced by putting the materials through a milling process. In the case of liquid or gaseous halogen compounds, the zirconium oxide should likewise be brought into intimate contact with these compounds. After the thorough mixing of the materials, the mixture may be burned directly or molded and then burned, or a liquid such as water may be added before molding and burning to produce a mass which is extremely plastic. The latter method will be necessary when dry zirconium oxide is mixed with a gas such as hydrogen chloride. It is well known that zirconium oxide mixed with water alone will not produce plastic masses and when substances of the nature of aluminum chloride, magnesium chloride and the like are added to the zirconium oxide, the resistance of the burned articles to heat and chemicals is reduced below that which it would be in the case of an article containing no aluminum or magnesium compounds, but consisting entirely of zirconium oxide. It will thus be seen that my invention makes possible the production of refractory articles of pure zirconium oxide, since the halogen compounds are driven off during the burning process as such, or as halogen hydride mixed with the volatile produce of hydrolysis, or both. During the mixing process referred to above, small amounts of water may be added during the mix rather than subsequently.

The proportions in which the halogen compounds may be used with zirconium oxide can be varied within considerable limits which are usually from about 1 to 10% by weight of the resulting mixture. When small amounts of water are present, the proportion of halogen compound can usually be made less than 10% by weight of the resulting mixture in order to obtain a mass of the desired plasticity.

What I claim is:

1. A process for the manufacture of articles of zirconium oxide which comprises forming a plastic mass by wetting zirconium oxide with a non-metallic halogen compound which is capable of being volatilized when heated and heating the halogen containing plastic mass until substantially nothing but the original zirconium oxide remains.

2. A process for the manufacture of articles of zirconium oxide comprising mixing zirconium oxide with a non-metallic halogen compound, capable of hydrolysis to a hydrogen halide and a volatile residue, so as to form a plastic mass and heating until substantially nothing but the original zirconium oxide remains.

3. A process for the manufacture of articles of zirconium oxide comprising mixing zirconium oxide with water and a non-metallic halogen compound, capable of hydrolysis to a hydrogen halide and a volatile residue, so as to form a plastic mass, molding the article to shape, and heating until substantially nothing but the original zirconium oxide remains.

4. A process for the manufacture of articles of zirconium oxide comprising mixing zirconium oxide with water and up to 10% of a non-metallic halogen compound, capable of being volatilized when heated, so as to form a plastic mass, molding the article to shape, and heating until substantially nothing but the original zirconium oxide remains.

5. A process for the manufacture of articles of zirconium oxide comprising mixing zirconium oxide with water and up to 10% of a non-metallic halogen compound, capable of hydrolysis to a hydrogen halide and a volatile residue, so as to form a plastic mass, molding the article to shape and heating until substantially nothing but the original zirconium oxide remains.

6. A process for the preparation of a plastic zirconium oxide mixture comprising mixing zirconium oxide and a non-metallic organic halogen compound capable of hydrolysis to a hydrogen halide and a volatile residue.

7. A process for the preparation of a plastic zirconium oxide mixture which comprises forming said plastic mass from zirconium oxide, water, and up to 10% by weight of a non-metallic organic halogen compound which is capable of being volatilized when heated.

8. A plastic mixture comprising zirconium oxide and a non-metallic halogen compound capable of hydrolysis to a hydrogen halide and a volatile residue.

9. A plastic mixture comprising zirconium oxide, water and up to 10% of a non-metallic halogen compound capable of being volatilized when heated.

10. A heat resistant mass consisting of zirconium oxide in coherent form obtained by heating a mixture of zirconium oxide and a non-metallic organic halogen compound capable of being volatilized.

11. A heat resistant article consisting of zirconium oxide in coherent form obtained by heating a mixture of zirconium oxide, water, and up to 10% of a non-metallic halogen compound capable of being volatilized.

Signed at Frankfort-on-the-Main, Germany, in the country of Germany and State of Hesse-Nassau, this 31st day of May, A. D. 1928.

EUGEN RYSCHKEWITSCH.